US007711600B1

(12) United States Patent  (10) Patent No.: US 7,711,600 B1
Curran et al. (45) Date of Patent: May 4, 2010

(54) IN-STORE SELF-SERVICE ORDERING GUIDE SYSTEM AND METHOD

(75) Inventors: John Curran, Saratoga, CA (US); Michael A. Curran, Westerville, OH (US)

(73) Assignee: Micro Industries Corporation, Westerville, OH (US)

( * ) Notice: Subject to any disclaimer, the term of this patent is extended or adjusted under 35 U.S.C. 154(b) by 85 days.

(21) Appl. No.: 11/842,322

(22) Filed: Aug. 21, 2007

Related U.S. Application Data

(63) Continuation-in-part of application No. 11/753,694, filed on May 25, 2007, which is a continuation-in-part of application No. 11/353,685, filed on Feb. 14, 2006, which is a continuation-in-part of application No. 11/131,052, filed on May 17, 2005, now Pat. No. 7,397,659, which is a continuation-in-part of application No. 10/937,976, filed on Sep. 10, 2004, now Pat. No. 7,072,179, which is a continuation-in-part of application No. 10/938,104, filed on Sep. 10, 2004, now Pat. No. 7,316,378.

(51) Int. Cl.
*E05B 75/00* (2006.01)
(52) U.S. Cl. ........................ 705/16; 705/22; 705/26; 705/27; 705/28
(58) Field of Classification Search ............ None
See application file for complete search history.

(56) References Cited

U.S. PATENT DOCUMENTS

| 5,250,789 | A | * | 10/1993 | Johnsen ............... 705/14 |
| 5,761,071 | A | | 6/1998 | Bernstein et al. |
| 5,781,708 | A | | 7/1998 | Austin et al. |
| 5,826,267 | A | | 10/1998 | McMillan |
| 5,845,263 | A | * | 12/1998 | Camaisa et al. ........... 705/27 |
| 5,890,137 | A | * | 3/1999 | Koreeda ................. 705/26 |
| 5,983,200 | A | * | 11/1999 | Slotznick .............. 705/26 |

(Continued)

OTHER PUBLICATIONS

"Management Software for Interactive Terminals—Kiosks—Media Displays," Kudos—Products, Copyright 2004, 2 pages from website, http://www.kudosdigital.com/products, printed Mar. 15, 2005.

(Continued)

*Primary Examiner*—F. Ryan Zeender
*Assistant Examiner*—Fateh M Obaid
(74) *Attorney, Agent, or Firm*—Standley Law Group LLP

(57) ABSTRACT

A self-service shopper ordering guide system and method for use by retailers to customize product ordering promotions. An ordering guide database is synchronized with the retailer's product and inventory databases so that current product data is available to the system. The self-service ordering guide system comprises tools for developing and deploying screens to self-service terminals located throughout a store. A screen flow editor prompts a user to define screens for an order flow and to specify products from the ordering guide database to include on screens. The user's selections populate screen templates that comprise an order flow. Photographs and files for use in the screens and subscreens allow a retailer to create a customized look. A shopper using an in-store terminal is prompted to make selections from the screens to create an in-store order. The ordering guide system is further integrated with the retailer's fulfillment system for processing online orders.

7 Claims, 17 Drawing Sheets

U.S. PATENT DOCUMENTS

| | | | | |
|---|---|---|---|---|
| 6,014,137 | A * | 1/2000 | Burns | 715/747 |
| 6,042,007 | A | 3/2000 | Nugent et al. | |
| 6,058,373 | A * | 5/2000 | Blinn et al. | 705/26 |
| 6,078,848 | A | 6/2000 | Bernstein et al. | |
| 6,179,206 | B1 * | 1/2001 | Matsumori | 235/383 |
| 6,473,739 | B1 * | 10/2002 | Showghi et al. | 705/26 |
| 6,502,076 | B1 | 12/2002 | Smith | |
| 6,628,307 | B1 * | 9/2003 | Fair | 715/763 |
| 6,661,433 | B1 * | 12/2003 | Lee | 715/764 |
| 7,072,179 | B1 | 7/2006 | Curran et al. | |
| 7,076,445 | B1 * | 7/2006 | Cartwright | 705/14 |
| 7,110,964 | B2 * | 9/2006 | Tengler et al. | 705/21 |
| 2001/0034664 | A1 | 10/2001 | Brunson | |
| 2003/0115096 | A1 | 6/2003 | Reynolds et al. | |
| 2005/0182680 | A1 * | 8/2005 | Jones et al. | 705/15 |
| 2006/0287913 | A1 | 12/2006 | Baluja | |

OTHER PUBLICATIONS

TouchPoint Solutions, Inc.—Catapult Software, Catapult™, Copyright 2005, 2 pages from website, http://www.touchpointsolutions.com/site/technology/discover_catapult.html, printed Mar. 15, 2005.

Copient Technologies, Copyright 2002, 1 page from website, http://web.archive.org/web/20030724224421/http://www.copienttech.com, printed Mar. 9, 2005.

Copient Technologies, Products and Services, Copyright 2002, 2 pages from website, http://web.archive.org/web/20030806105437/www.copienttech.com/pro..., printed Mar. 9, 2005.

"Software for Interactive Terminals, Kiosks and Media Displays," Kudos, 12 page brochure, www.kudosdevelopment.com, date unknown.

* cited by examiner

FIG-3B

Welcome to the Screen Flow Editor     [Main Menu]

Please select a Screen Flow to edit:

| Screen Flow | Begins | Ends | | |
|---|---|---|---|---|
| Catering/Party Platters | Feb 14, 2007 | Feb 14, 2008 | Remove | Delete |
| Easter & Passover | Mar 21, 2007 | Apr 09, 2007 | Remove | Delete |
| Gift Baskets | Feb 14, 2007 | Feb 14, 2008 | Remove | Delete |
| Party Platters | Jan 01, 2007 | Dec 31, 2007 | Remove | Delete |
| Store Info | Jan 01, 2007 | Dec 31, 2007 | Remove | Delete |
| Thanksgiving 2007 (US) | Oct 22, 2007 | Nov 24, 2007 | Remove | Delete |

Welcome to the Screen Flow Editor

Please select a Front Page to edit:

| Front Page | | |
|---|---|---|
| Columbus Showroom | Remove | Delete |
| Spring 2007 Events (Demo) | Remove | Delete |

210

Create New

Main Menu

FIG-3M

Welcome to the Screen Flow Editor | Main Menu |

Please select a Store to configure:

| Code | Store | Current Front Page | |
|---|---|---|---|
| ARD | Arden Way | Spring 2007 Events (Demo) | ▷ |
| BLV | Bellevue | Spring 2007 Events (Demo) | ▷ |
| BRD | Bridgeport | Spring 2007 Events (Demo) | ▷ |
| BRK | Berkeley | Spring 2007 Events (Demo) | ▷ |
| CBL | Campbell | Spring 2007 Events (Demo) | ▷ |
| CPT | Cupertino | Spring 2007 Events (Demo) | ▷ |
| FRK | Franklin | Spring 2007 Events (Demo) | ▷ |
| FRS | Fresno | Spring 2007 Events (Demo) | ▷ |
| LAT | Los Altos | Spring 2007 Events (Demo) | ▷ |
| LGT | Los Gatos | Spring 2007 Events (Demo) | ▷ |
| MLV | Mill Valley | Spring 2007 Events (Demo) | ▷ |
| MRY | Monterey | Spring 2007 Events (Demo) | ▷ |
| PAL | Palo Alto | Spring 2007 Events (Demo) | ▷ |
| PET | Petaluma | Spring 2007 Events (Demo) | ▷ |
| PRT | Portland | Spring 2007 Events (Demo) | ▷ |
| PRV | West Vancouver | Spring 2007 Events (Demo) | ▷ |
| RAM | San Ramon | Spring 2007 Events (Demo) | ▷ |
| RED | Redwood City | Spring 2007 Events (Demo) | ▷ |
| RMD | Redmond | Spring 2007 Events (Demo) | ▷ |
| RSO | Roosevelt Square | Spring 2007 Events (Demo) | ▷ |

230

232

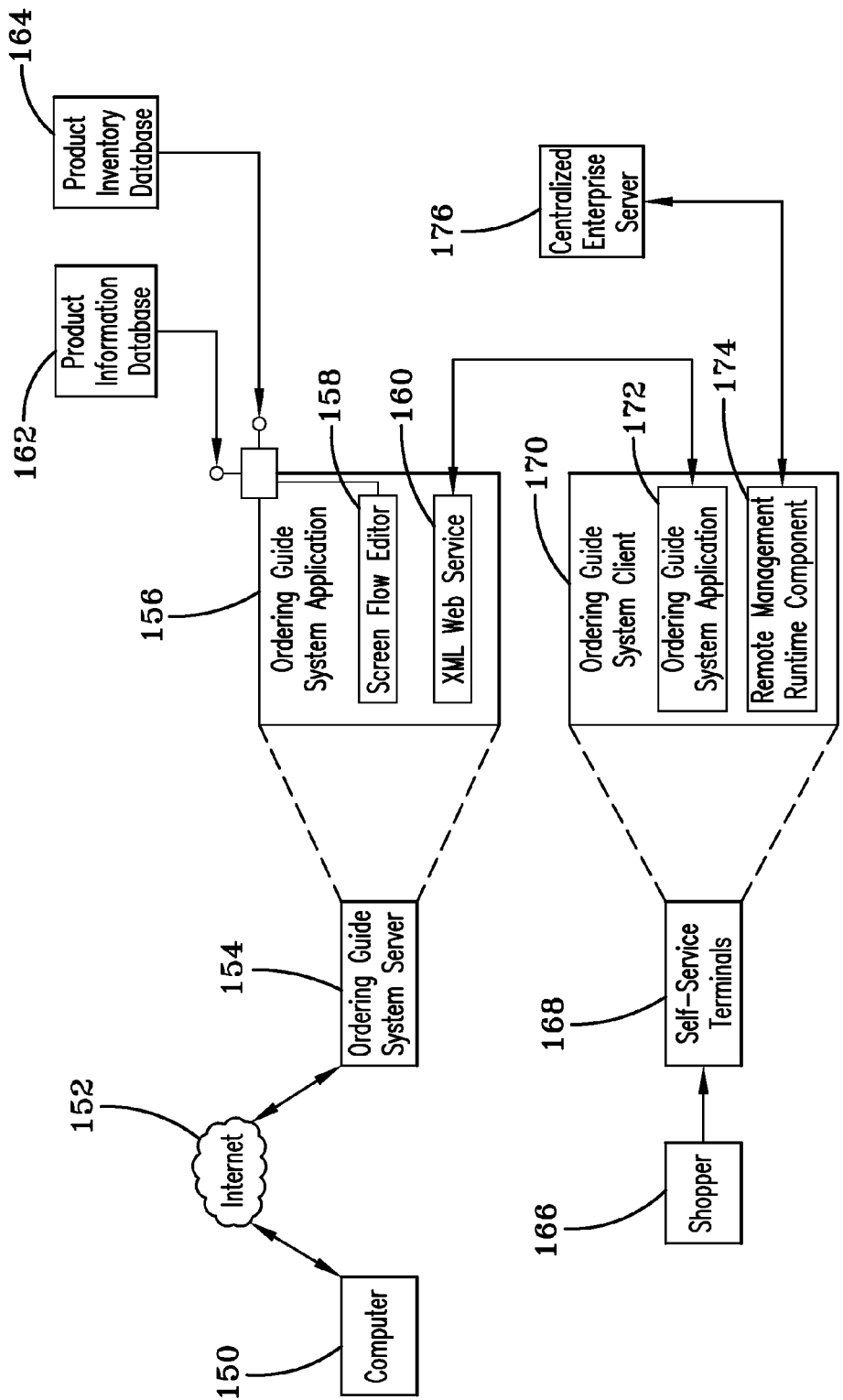

IN-STORE SELF-SERVICE ORDERING GUIDE SYSTEM AND METHOD

CROSS REFERENCES TO RELATED APPLICATIONS

This application is a continuation-in-part application under 37 CFR 1.53(b) of U.S. patent application Ser. No. 11/753,694, entitled Integrated Self-Service Customer Ordering System and Point of Sale System filed on May 25, 2007, which is incorporated herein by reference, which is a continuation-in-part application under 37 CFR 1.53(b) of U.S. patent application Ser. No. 11/353,685, entitled Trade Promotion Management System and Method filed on Feb. 14, 2006, which is incorporated herein by reference, which is a continuation-in-part application under 37 CFR 1.53(b) of U.S. patent application Ser. No. 11/131,052, entitled Integrated Display Computer with Peripherals filed on May 17, 2005, which is incorporated herein by reference, which is a continuation-in-part application under 37 CFR 1.53(b) of U.S. patent application Ser. No. 10/937,976, entitled Fanless Computer With Integrated Display filed on Sep. 10, 2004, which is incorporated herein by reference and this application is a continuation-in-part application under 37 CFR 1.53(b) of U.S. patent application Ser. No. 10/938,104, entitled Adjustable Bracket Assembly for Shelf-Mounting an Electronic Display Device filed on Sep. 10, 2004, which is incorporated herein by reference.

FIELD OF THE INVENTION

The present invention relates generally to self-service order management systems. The present invention is a self-service shopper ordering guide system and method that allows shoppers to place orders for products while in a store and to have them filled using the store's standard fulfillment system. In an example embodiment, it is implemented as an extension to a trade promotion management system

BACKGROUND OF THE INVENTION

Trade promotion systems help retailers create more tailored and relevant shopping experiences for shoppers that set them apart from the competition. One such computerized system that allows retailers to customize product and service promotions according to individual shopper preferences is described in U.S. patent application Ser. No. 11/353,685, entitled Trade Promotion Management System and Method. The invention described in the '685 patent application supports the development and deployment of customized promotions to significantly enhance the shopping experiences of retail shoppers. Using the invention, a retailer may provide each shopper with meaningful and relevant information based on the shopper's preferences and personal situation. The '685 patent application explains a process of developing and deploying trade promotions that is automated using a sophisticated system of computer hardware and software.

Targeted promotions according to the '685 invention are presented to shoppers upon their entry into the store or in the store aisles. Self-service terminals located throughout the retail establishment allow shoppers to identify themselves (e.g., by swiping or scanning a card with identifying information or by entering identification information) and to obtain information about products and services that are likely to be of interest. Promotions as well as terminals are managed centrally and allow a retailer to use a systematic approach to managing targeted promotions.

The trade promotion system of the '685 patent application is a complete enterprise-class solution for the remote operation of smart screen (terminal) networks using dynamic digital signage. It is a high-performance yet easy to use computer system that does not require programming knowledge to operate. It comprises an intuitive web interface and allows for definition of multi-user roles and permissions. File optimization ensures that only the required files are distributed in an automated process to single or multiple terminal devices that are fully monitored. All operations are logged. Multiple media types such as video (MPG, AVI), Flash, audio (MP3, WAV), still image (JPG, BMP), URL, and HTML are supported to provide a variety of shopper experiences.

Although an in-store trade promotion system can provide users with information about products of interest within the store, there is little opportunity for shoppers to find out about other products and services that the retailer may offer only through another outlet such as an online shopping or web site. Many retailers operate such online shopping sites to offer additional products and services to complement their store offerings. The additional products may be large products that the store does not stock or stocks only in small quantities because they require a substantial amount of floor space. The additional products may also be products that the store does not stock because the demand for them is low. Finally, the additional products may be products that require special handling or packaging such as gift baskets with items selected by the shopper or products customized for the shopper.

Some retailers provide shoppers with in-store access to their online shopping sites by providing self-service terminals within the store that connect to the retailer's online store or web site. While at the store, the shopper may peruse the retailer's online store or web site and select products to purchase. Although the shopper may be permitted to purchase products from the online store or web site, the experience is not connected in any way to the shopper's store experience. The experience is the same as it would be if the shopper completed it at a home computer rather than at the store. In some instances, a shopper is asked to provide a location because the online site is not designed to know where the shopper is located and to know that the shopper is actually accessing the site from one of the site's retail outlets.

Adapting an online store or web site for use within a particular store is one way to provide a more relevant ordering experience for a shopper. A single adaptation, however, may not work for retailers that have many stores, each of which is tailored to meet the needs of shoppers within a particular geographic region. Accounting for regional differences may require the retailer to provide different, customized online ordering experiences for shoppers throughout the country. The retailer may want to offer different products and services depending upon each store's location. The retailer may also want to change the offerings frequently to promote different specials, seasonal products, etc. according to store location. Finally, the retailer may want to promote products and services differently depending upon the locations of the self-service terminals within the store.

Providing such current, customized online experiences for different stores and locations of terminals within stores requires significant technical resources and expertise. Existing web pages and software applications may need to be modified frequently and in many different ways to accommodate different promotions and events. Even if the web pages and applications can be customized for different stores in different geographic regions as well as for different locations within a store, additional applications are needed to deploy the web pages and applications as envisioned by the retailer.

Most retailers do not have the resources and expertise that is needed to develop and deploy an in-store ordering system so they use the use third-party vendors to provide equipment and/or services. Because such systems typically do not have customization features and are not designed for frequent changes, retailers continue to use the system as it was deployed initially and are not likely to ask the vendor to update it.

As a result of the difficulties in adapting technology to meet the needs of individual stores, many retailers continue to rely on paper order forms for shopper in-store orders. For example, food stores that offer catered meals may invite shoppers to complete a paper order form that allows a shopper to select a complete meal or specific food items for a meal to be provided at a later date. The shopper's selections may then be entered in a computer system that the store operates to manage such in-store orders. For some food stores, the volume of catering orders they receive at certain times of the year (e.g., for Thanksgiving Day, for Mother's Day, etc.) require careful planning and logistics to ensure each shopper receives the correct meal when requested.

The reliance on paper forms for recording shopper in-store orders results in several problems. Data entry errors may occur when information from orders is entered in the store's computer system. In addition, it can be difficult for shoppers to follow the logic of the form. They may require assistance from a store representative just to understand the product offerings and what they need to do to complete the order form. Although in-store ordering of products may be offered as a convenience to shoppers, the process can be labor-intensive and expensive for the stores that offer the service. If the demand for placing in-store orders increases even temporarily and the store is unable to meet the current, temporary demand, some shoppers may become frustrated and forego the opportunity to place an in-store order. For shoppers that do place orders, if their orders are processed incorrectly, they are unlikely to place future orders.

Existing manual and partially automated systems for in-store ordering fail to address the needs of shoppers as well as the stores that offer in-store ordering to their shoppers. There is a need for a system and method for incorporating self-service ordering with in-store shopping that reduces a store's reliance on manual processes and that does not require substantial technical resources and expertise to implement and update. There is a need for a system and method for providing a self-service ordering experience that is tailored to meet varying needs at different stores within a retailer's control and at different locations within each store. There is a need for a system and method for self-service ordering that is easy for shoppers to understand and use and that allows shoppers to place orders with little or no assistance from store representatives.

SUMMARY OF THE INVENTION

The present invention is self-service shopper ordering guide system that is an extension to a trade promotion management system and method for customizing product and service promotions according to individual shopper preferences. The self-service ordering guide system is integrated with a retail back-office system that allows a store representative to create screen flows for products and services that can be ordered online using self-service terminals. The ordering guide system uses product information and data from a retailer's back-office inventory computer system so that order and inventory data are consistent. The self-service ordering guide system comprises tools for developing and deploying order screens to terminals throughout a store.

The product ordering database is configurable based on the kinds of products the stores offers and the back-office databases deployed by the store. Each product record comprises a name, description, price, and options for linking the product to other complimentary products. In an example ordering guide system deployed in a food store, meat products may have associated potato, vegetable, and gravy options so that a shopper ordering a meat product is also presented with options for ordering additional items to accompany the meat product. In another example, one or more cell phone service plans may be linked to a particular cell phone. In an example embodiment of the present invention, items in the product ordering database are linked to a store's back-office database using an external product identifier.

A screen flow editor allows a store representative to create a series of screens for ordering products. The editor prompts the representative for information to include on screens and subscreens to create a complete order flow from shopper selections of specific items through payment. The representative provides information that is used to populate screen templates that comprise an order flow. The representative may upload photographs for use in the screens and subscreens to create a customized look for the store. Screen flows are then deployed at the store terminals with which shoppers interact.

A shopper using an in-store terminal is prompted to make selections from the screens to create an in-store order. Certain screens comprise products that are linked to other product options from which the shopper may choose. The resulting order is customized according to the shopper's selections. In an example ordering guide system deployed in a food store, a shopper may order a complete meal by responding to a series of prompts and selecting items to create a complete meal comprising a main course, side dishes, and dessert. In another example, a shopper may select accessories such as shirts, ties, and cufflinks to wear with a custom crafted suit.

BRIEF DESCRIPTION OF THE DRAWINGS

FIG. 4 is a system architecture diagram for a self-service ordering guide system according to an example embodiment of the present invention.

DESCRIPTION OF EXAMPLE EMBODIMENTS

The present invention comprises various hardware and software components that operate to support integration of a self-service trade promotion system and ordering guide system. The software includes both server and client components. The software operates on an Open Standards base enterprise platform integrated with existing point-of-sale and retail back-office systems. It comprises a remote management system for managing remote terminals and a self-service transactional framework. The client and server both use Microsoft .NET technologies such as ASP.NET and XML Web Services, open standards such as XML and AJAX, plus Adobe Flash for presentation.

In-store devices or self-service terminals execute a selection of applications that communicate over a wired or wireless network to the retailer's store server so they are seamlessly integrated with existing retail back-office systems. Data is exchanged between the in-store devices and the retailer's servers to provide ordering applications and to complete orders from payment through fulfillment. The ordering guide system of the present invention enables retailers to provide a media-rich interactive/guided shopping experience in-store using self-service terminals.

Figure 1:
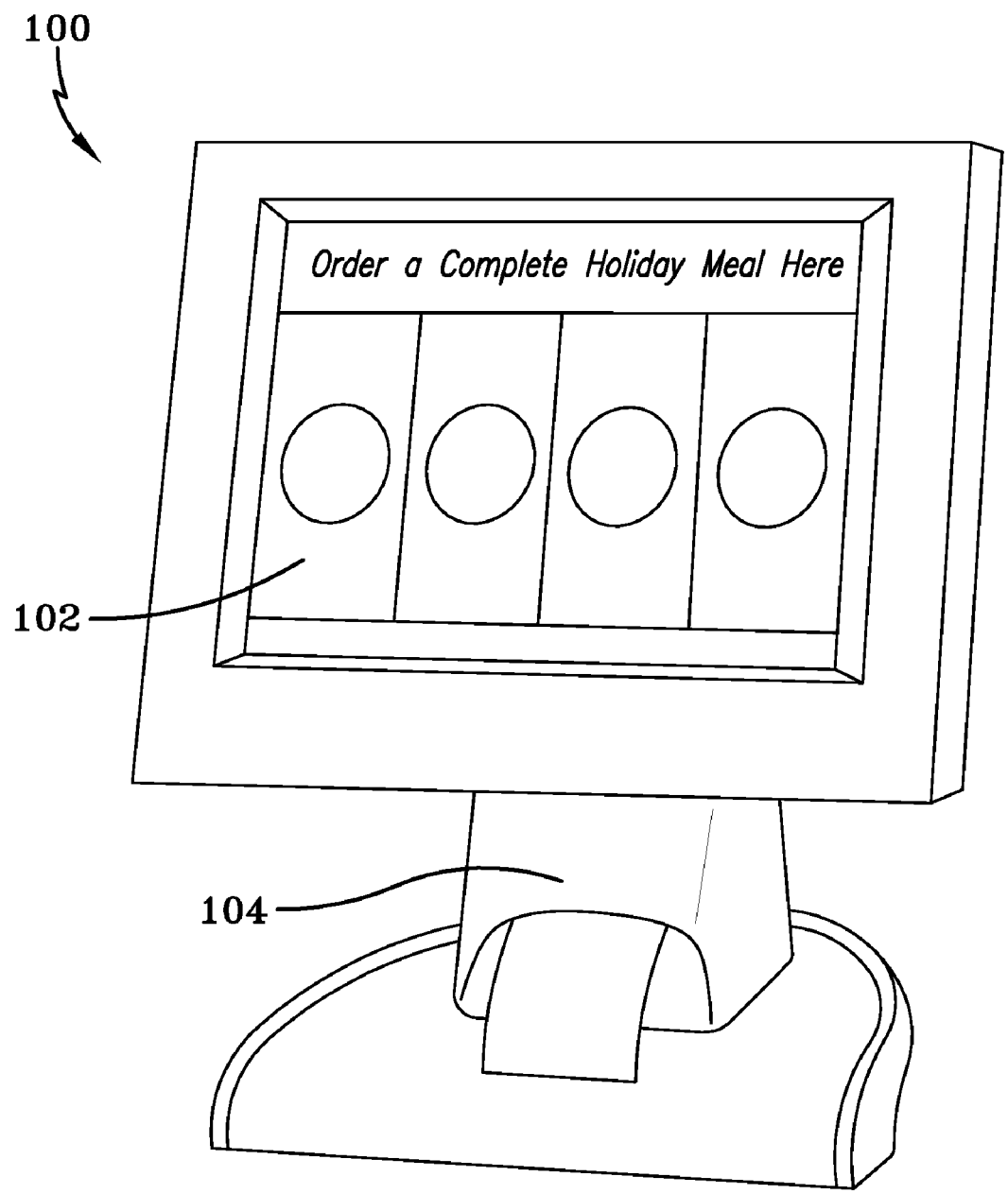
FIG. 1 a self-service terminal according to an example embodiment of the present invention.

In-store interactive devices or self-service terminals are positioned for use when the shopper enters the store or is in the store aisles and are used to collect data, to provide information and trade promotions to shoppers, and to process shopper requests to order products. Referring to FIG. 1, a self-service terminal according to an example embodiment of the present invention is shown. The self-service terminal 100 comprises a touch screen 102 for presenting ordering options to shoppers and determining their selections and a printer 104 for dispensing receipts for orders placed by shoppers.

Figure 2:
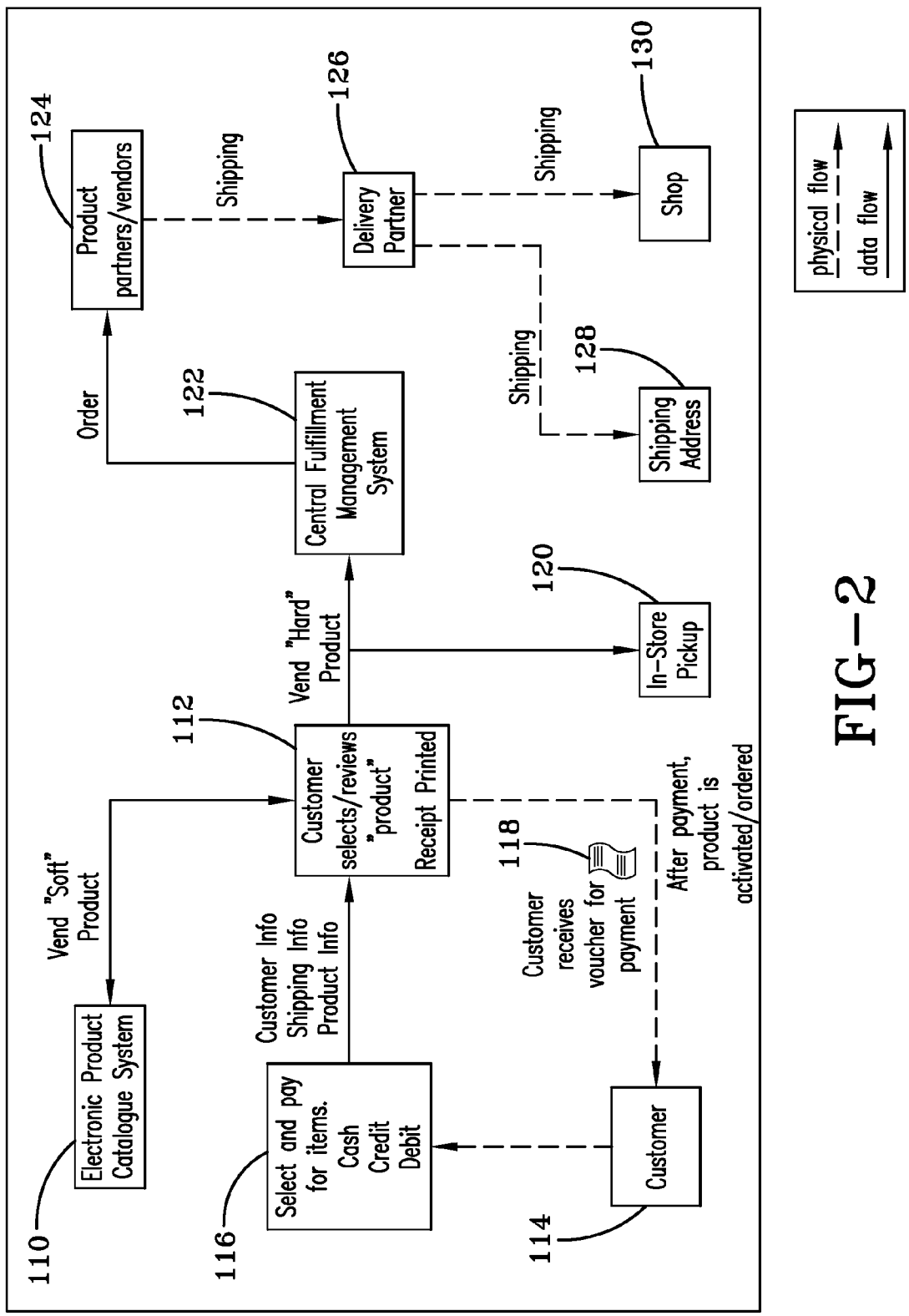
FIG. 2 is a flow diagram for processing orders according to an example embodiment of the present invention.

In an example embodiment of the present invention, the shopper browses through available products organized in a variety of ways such as by category, size, season, brand, price, and promotion. Products may be organized differently depending upon the regional location of a store and location of the self-service terminal within the store. Each screen of information is laid out in an attractive design that is consistent with in-store branding and thus familiar to the shopper. Referring to FIG. 2, a flow diagram for processing orders according to an example embodiment of the present invention is shown. Product data used in a menu and ordering guide application at a self-service terminal 112 is received from an electronic product information system 110. The shopper 114 navigates the application at the self-service terminal 112 to select desired products and customize them according to size, color, options, etc., and then adds them to a "shopping basket" and continues shopping. Once the shopper 114 has completed his or her selections, the application prompts the shopper for information such as the shopper's name, contact telephone number, pick-up date or shipping information, choice of gift-wrap, and so on 116. If payment is required, the shopper is prompted to pay 116 using a credit-card swipe built into the self-service terminal 112. The contact information, shipping information, and selected product information provided by the shopper 116 using the self-service terminal order is communicated to the store's back-office system and to the retailer's fulfillment system 122. A confirmation receipt 118 for the shopper 116 is printed and dispensed from the self-service terminal 112.

If the product is available from the store's inventory, the shopper may arrange for in-store pickup 120. The pickup may occur the same day the order was placed or on another day selected by the shopper. For orders to be shipped to the shopper's home or other specified shipping address, the order is communicated to the retailer's products partners or vendors 124 for processing. The ordered products are transferred to a delivery partner 126 for delivery to the shipping address 128. Shipment information is also communicated to the retailer 130.

Figure 3A:
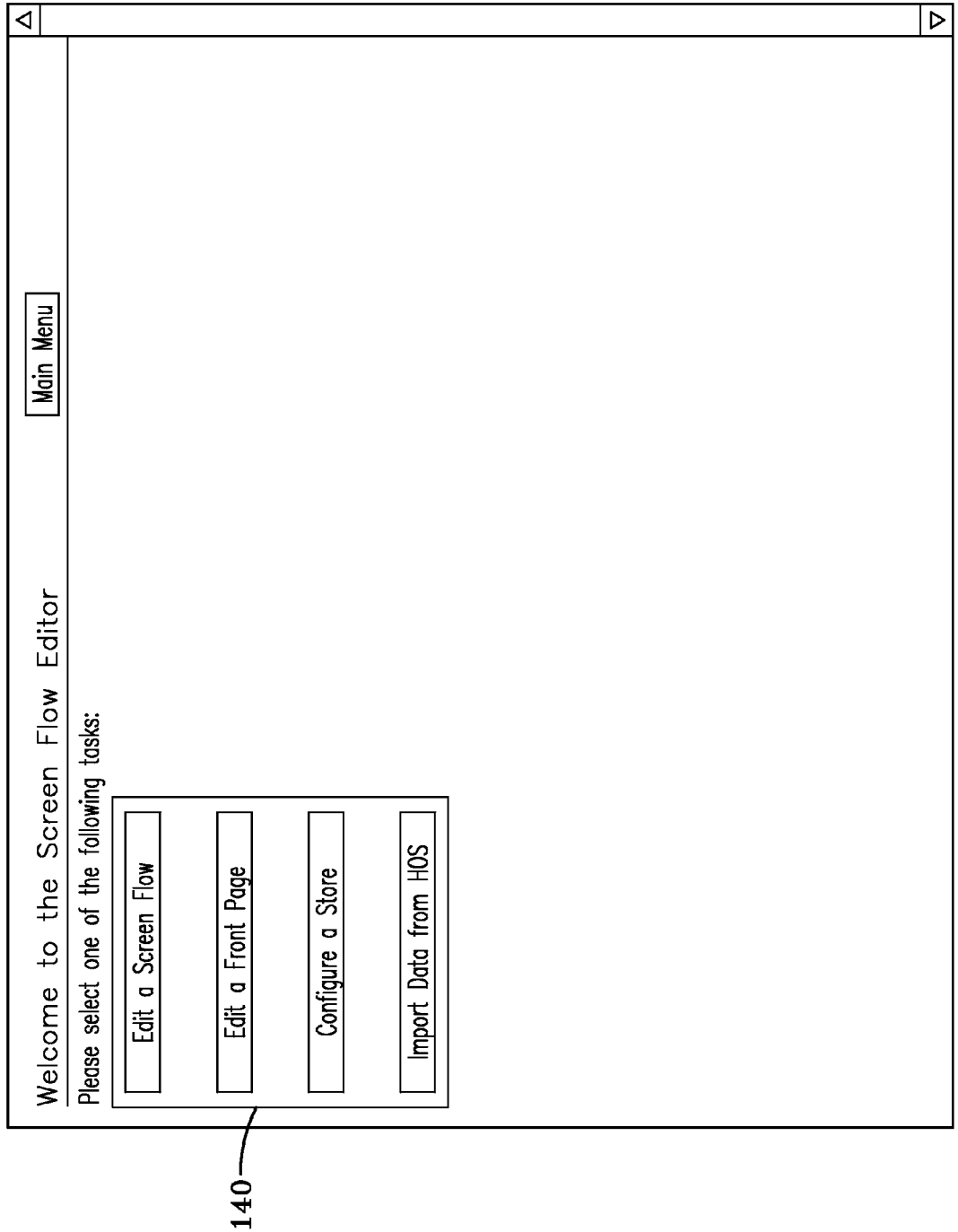
FIGS. 3A-3N are a sample screens from a screen flow editor according to an example embodiment of the present invention.
Figure 3C:
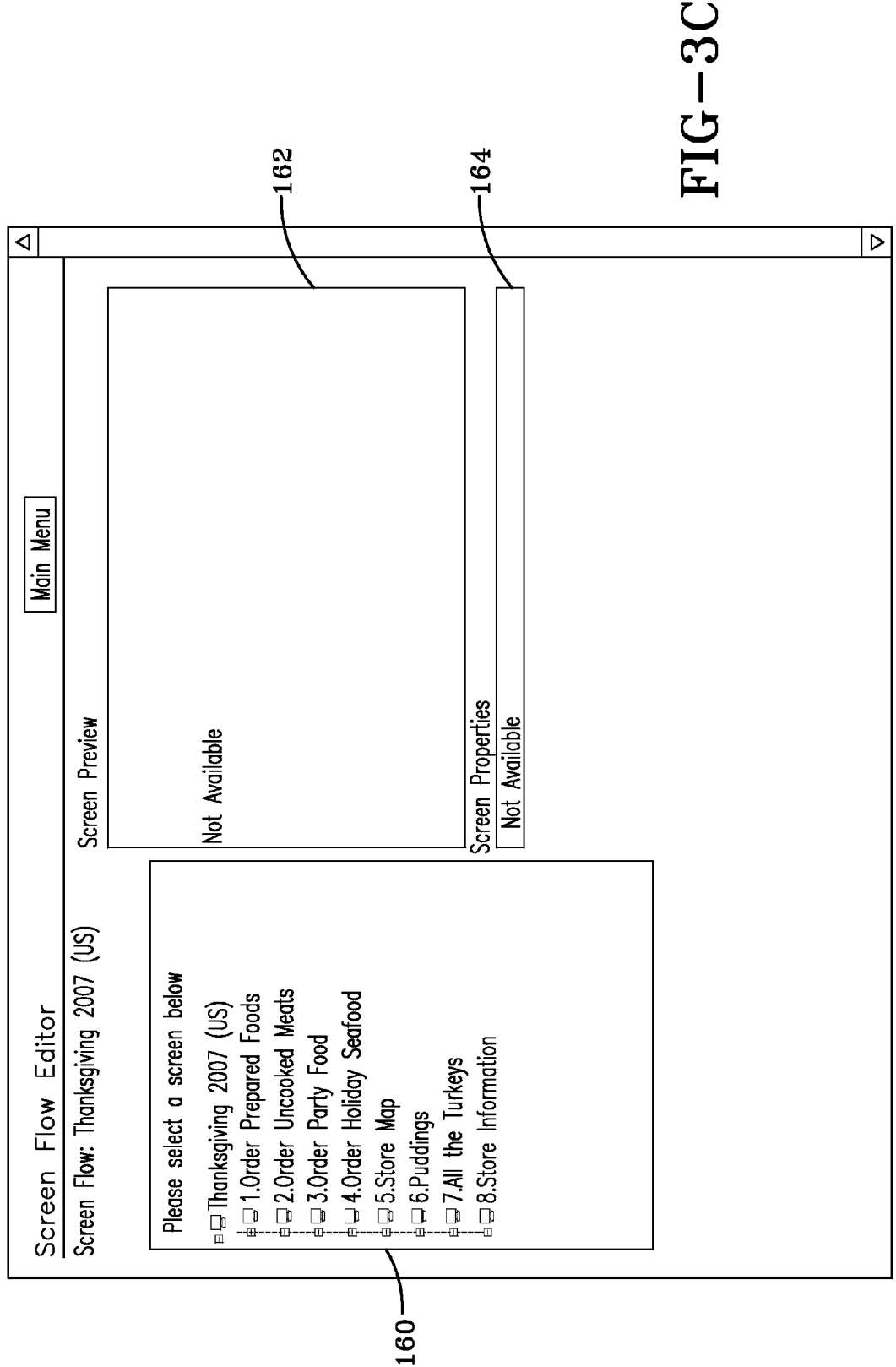
Figure 3D:
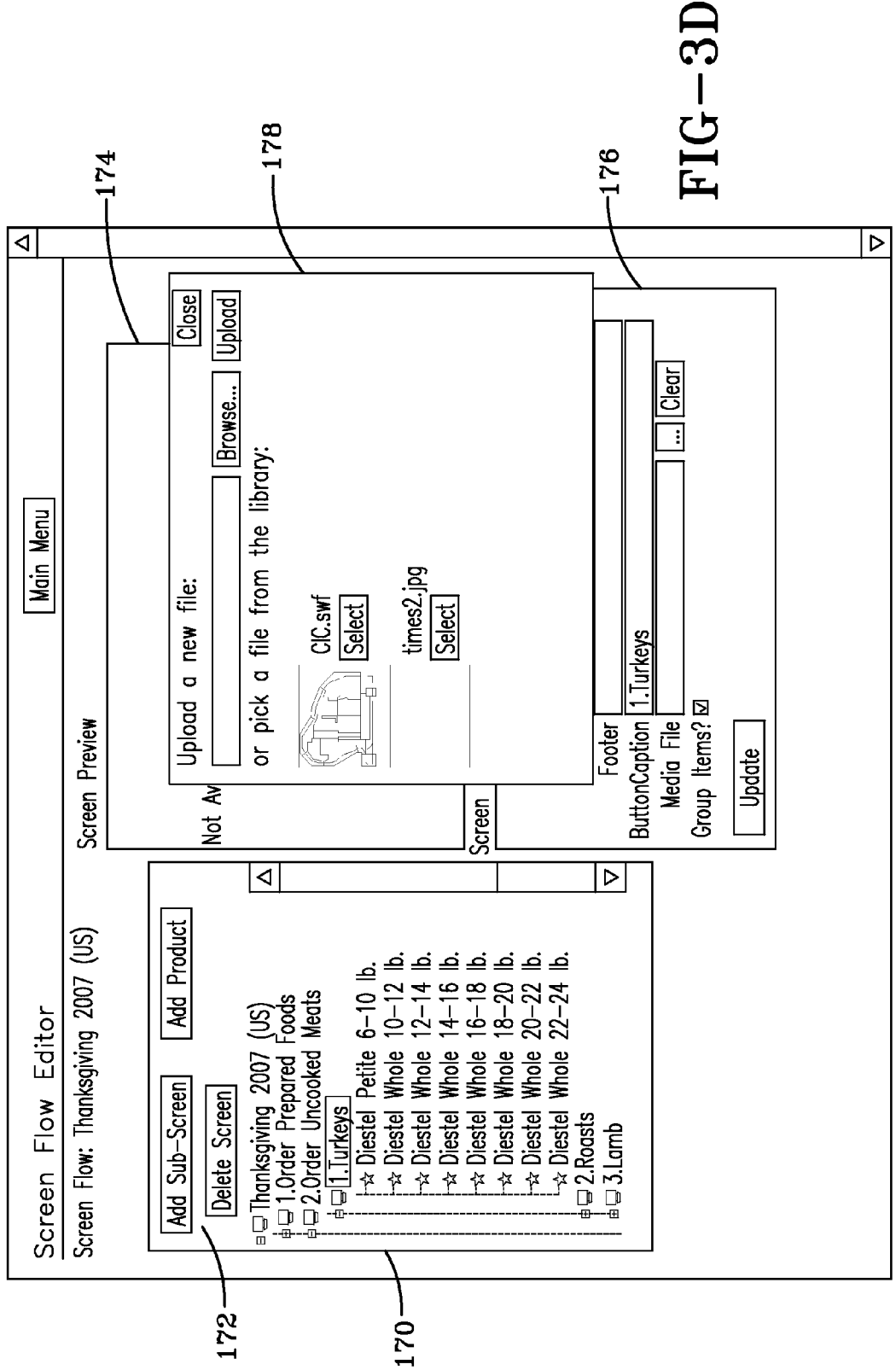
Figure 3E:
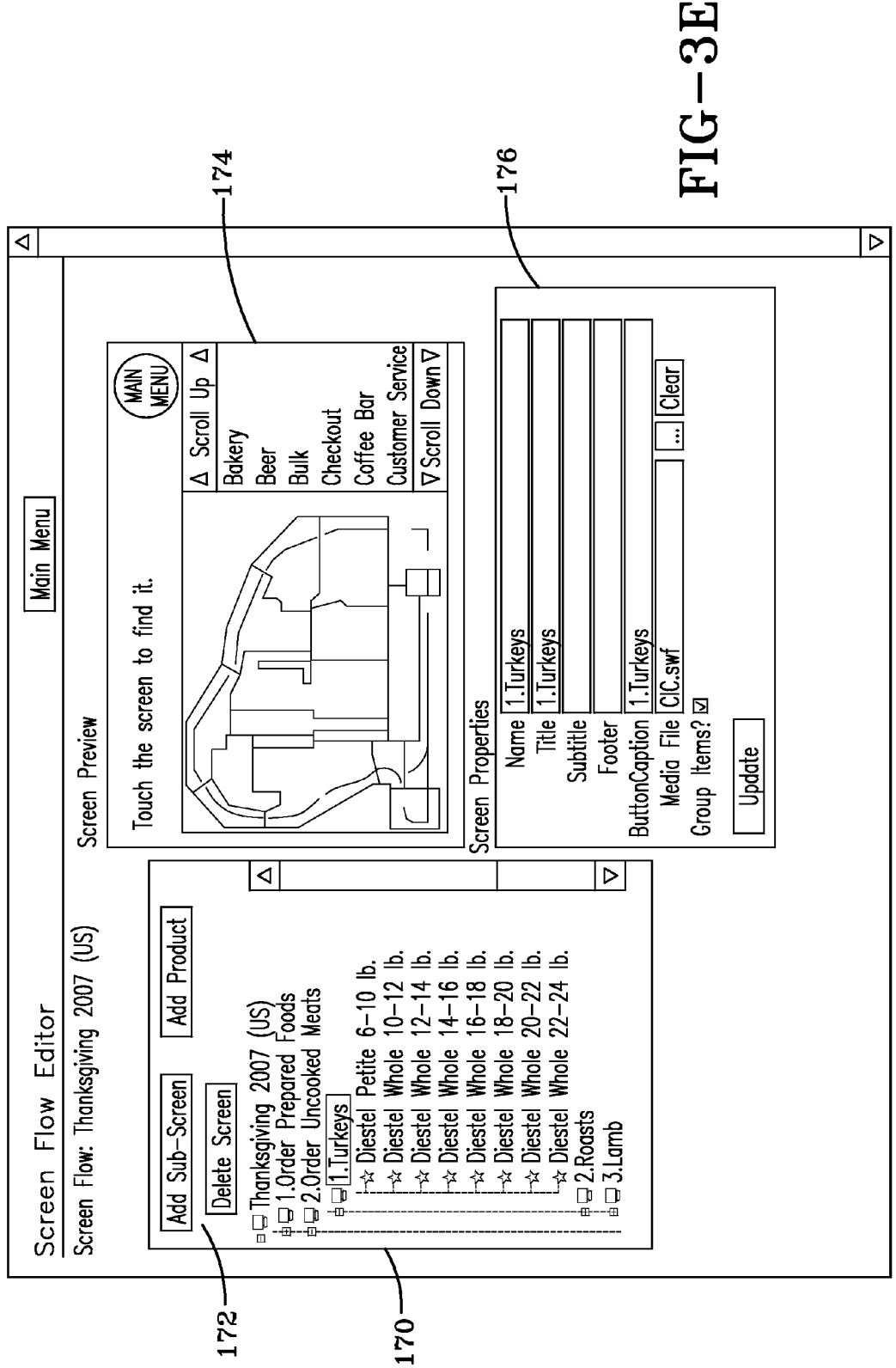
Figure 3F:
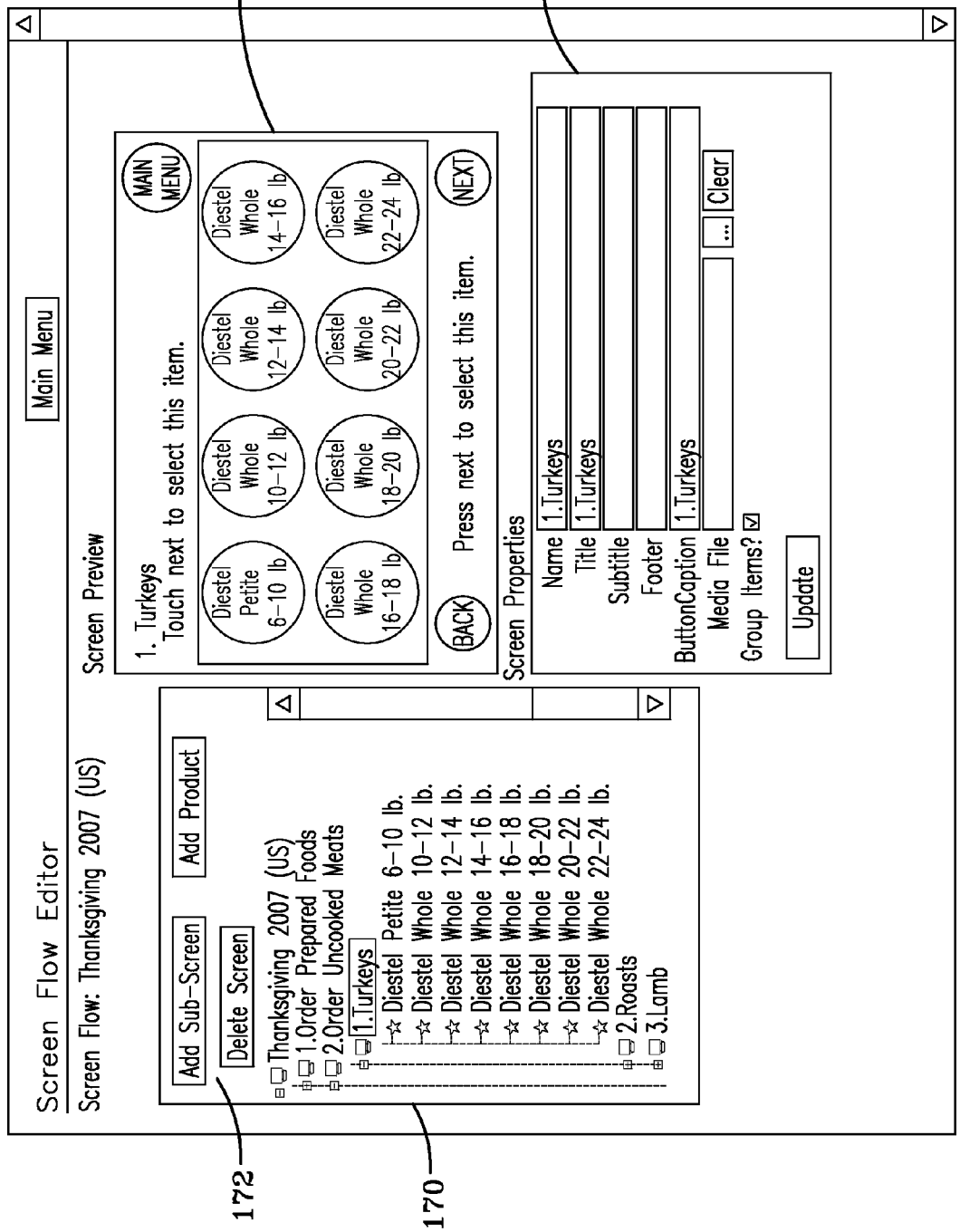
Figure 3G:
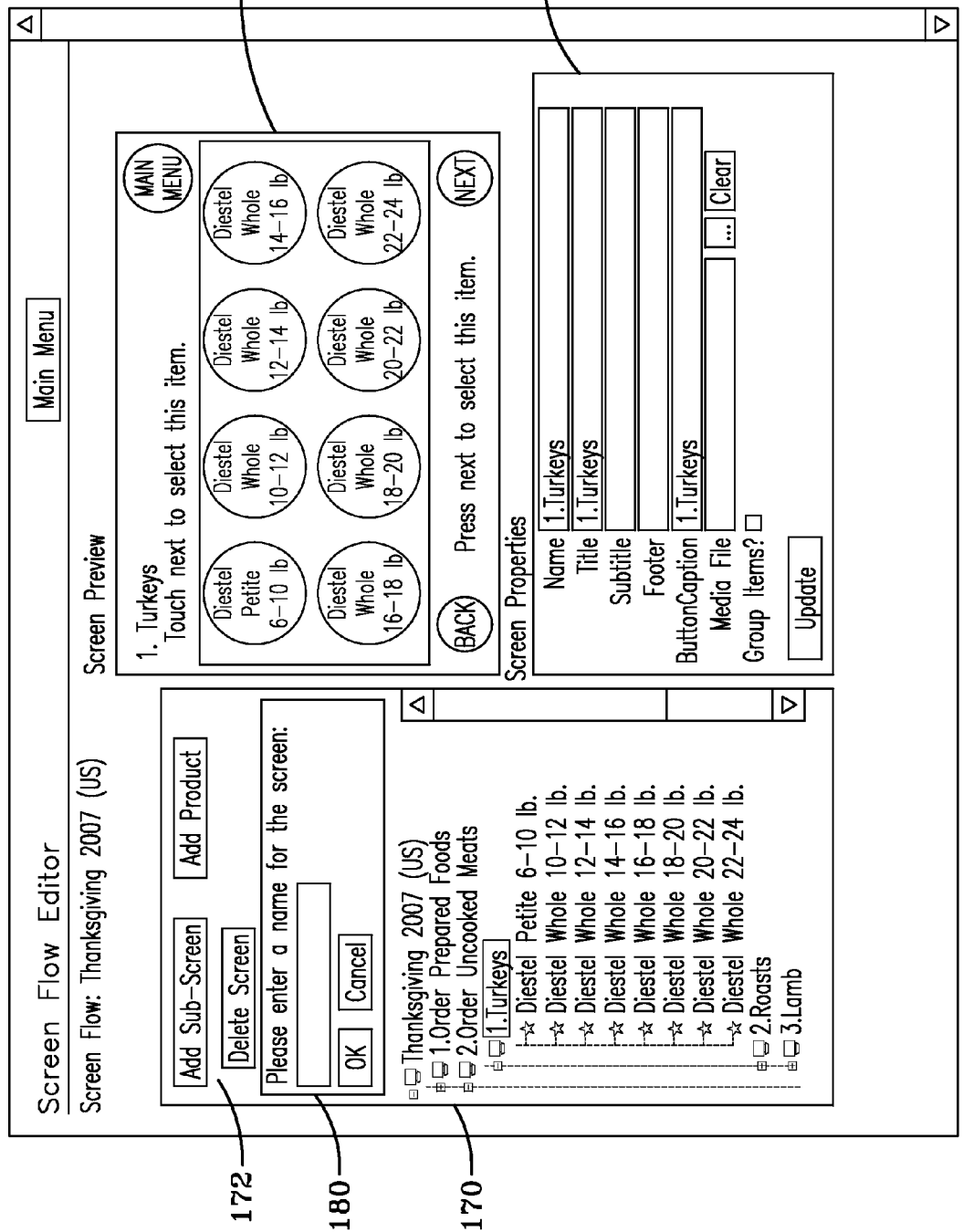
Figure 3H:
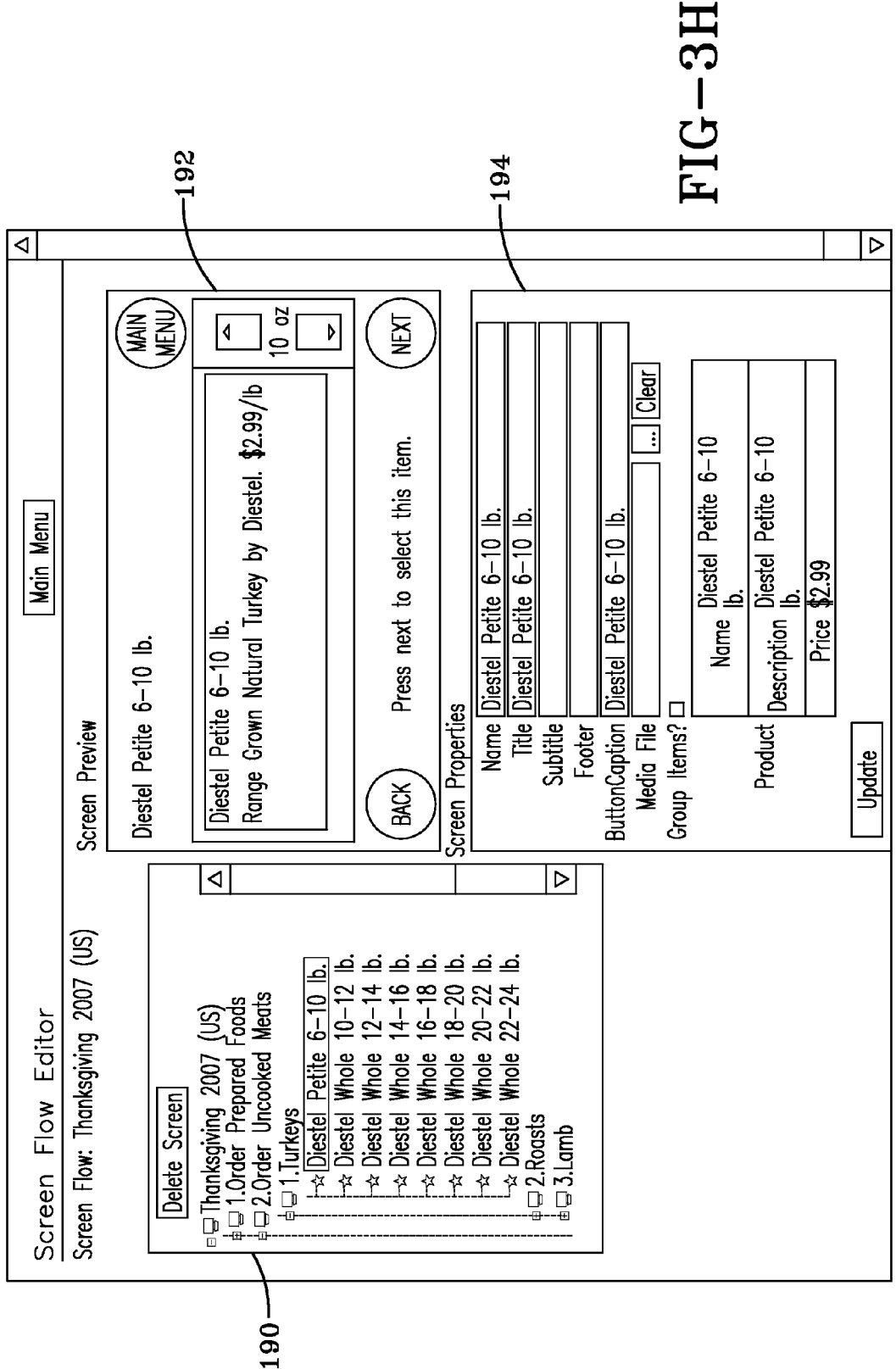
Figure 3I:
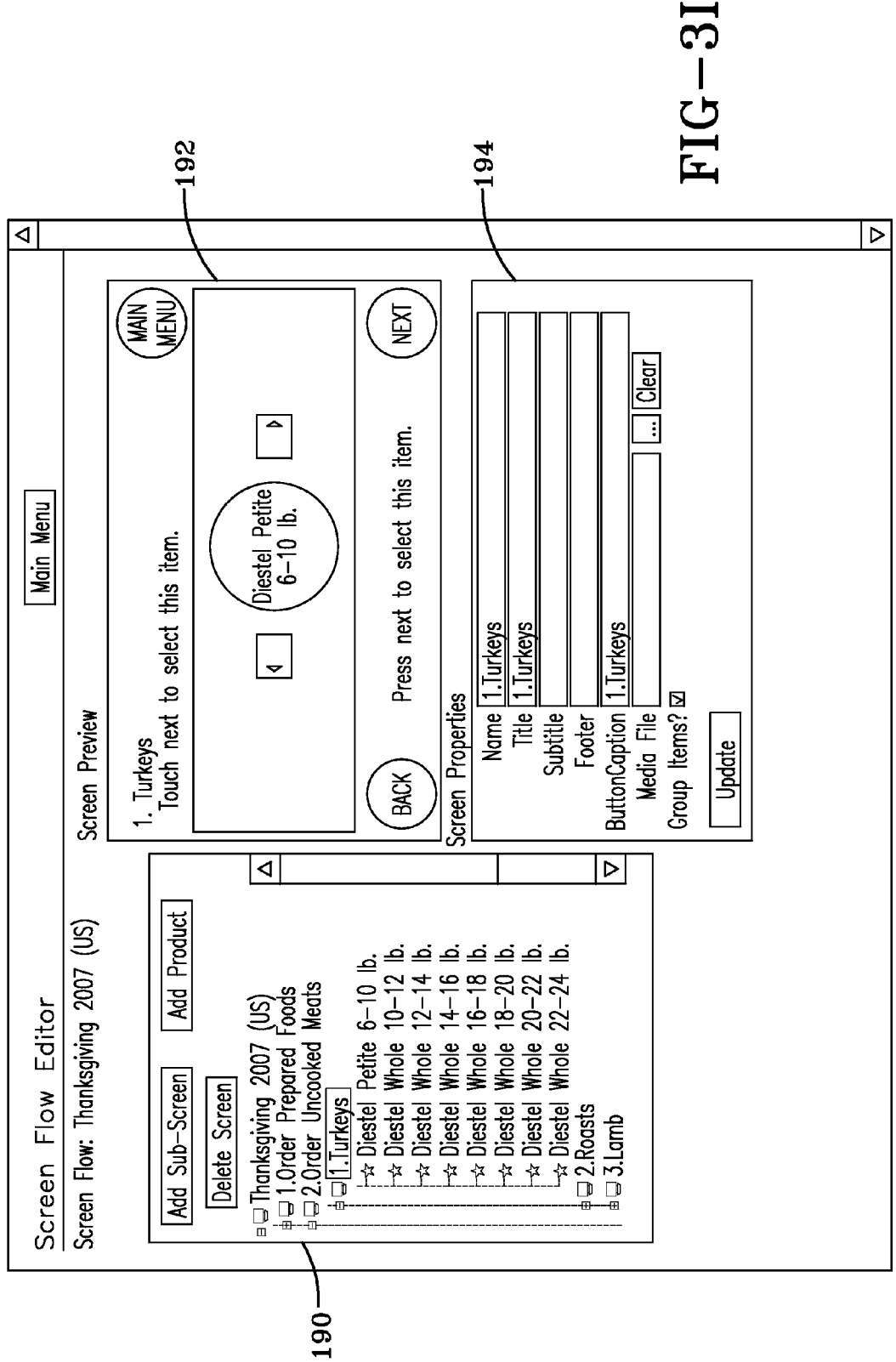
Figure 3J:
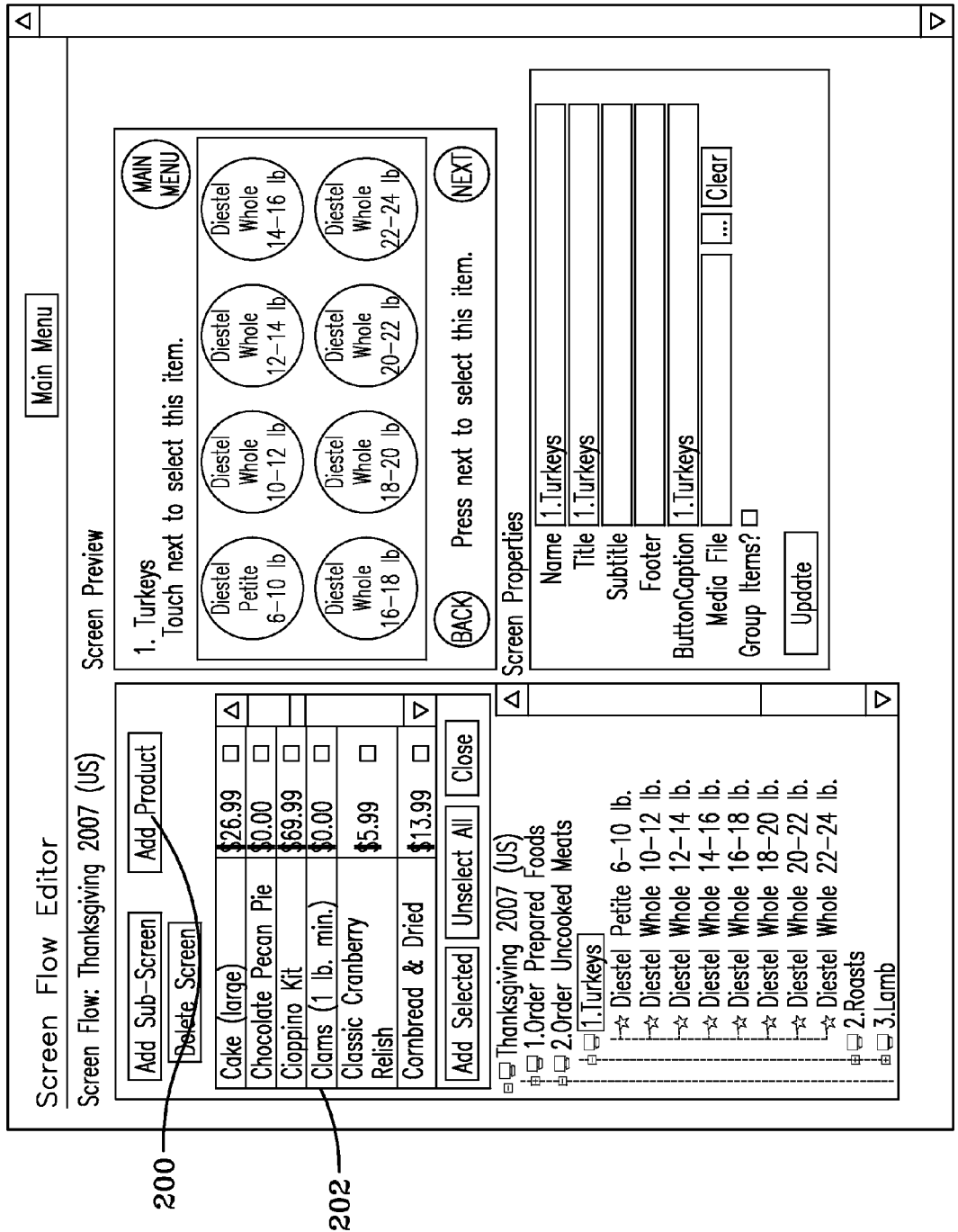
Figure 3L:
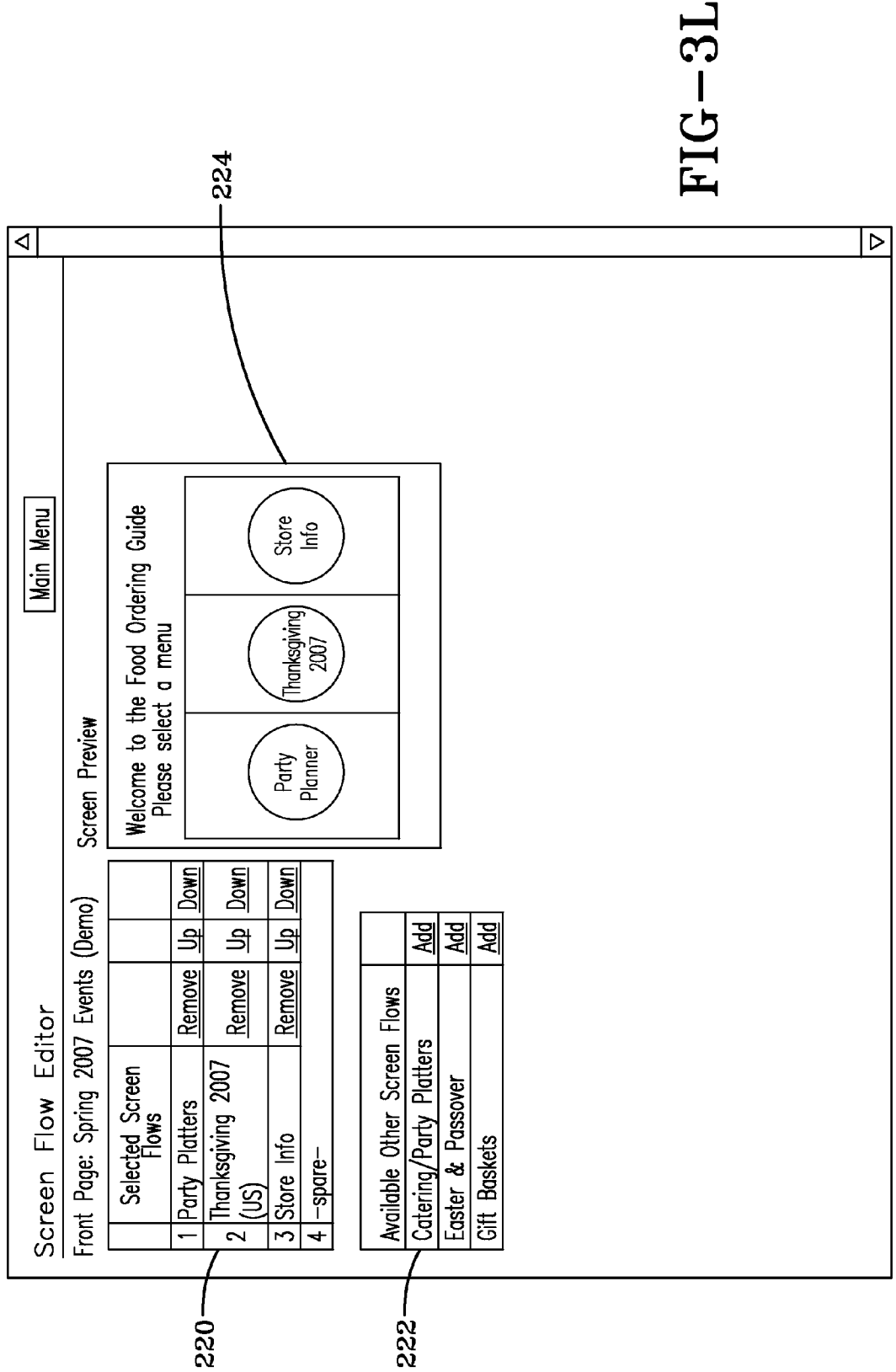
Figure 3N:
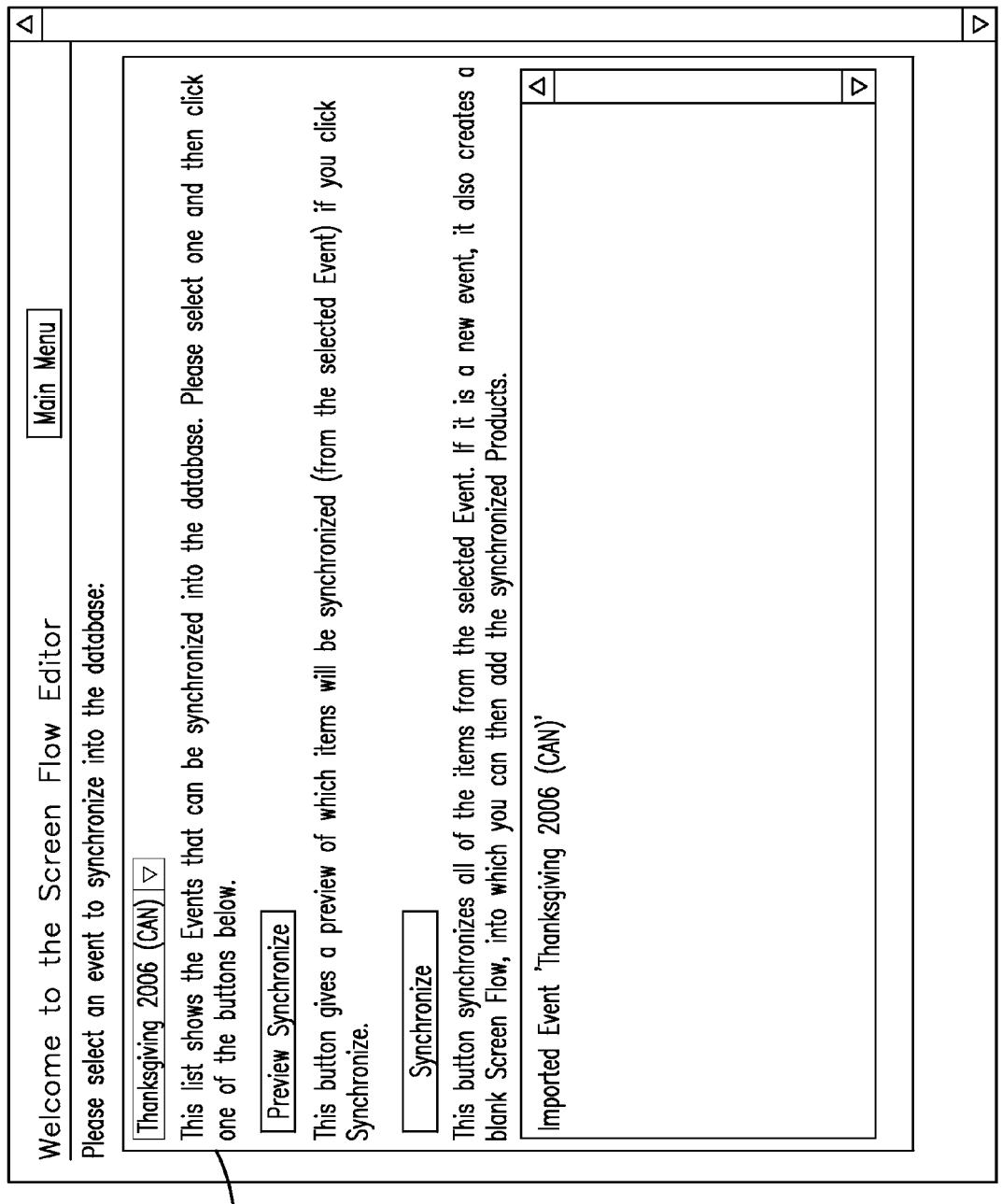

Referring to FIGS. 3A-3N, samples screen from a screen flow editor according to an example embodiment of the present invention are shown. The screen flow editor is a web application for editing menus that execute on self-service terminals to facilitate shopper ordering of products. The screen flow editor simplifies the development of new self-service applications by the retailer. Marketing teams can design an attractive presentation of the products available to the user, modify the details at any time and publish the updates to self-service terminal very easily.

The screen flow editor uses an ordering guide product database that comprises information about each product offered by the store. Each product in the ordering guide product database has a name, a description, a price, an external product identifier for linking it to a back-office product or inventory database, and one or more related options. For example, a grocery store database may have a beef product that has associated options of potatoes (mashed or au gratin), vegetables (beans or broccoli), and gravy. Additional ordering guide product information for each product includes quantity step or product package increments that indicate the units by which the product is sold (e.g., one dozen, ½ dozen, one package, one pound, etc.) Each ordering guide product also has a quantity recommended such as one package, one pound. The resulting "catalog of products" is then used to create the screen flows for product ordering.

The graphical user interface of the screen flow editor allows a user to create a navigational flow in a hierarchical structure. In an example embodiment of the present invention for ordering food products, product selections may be organized initially according to seasons or holidays (e.g., Easter and Passover). Product selections may further be organized according to individual product categories and then items (e.g., natural meats and then ham, beef, lamb, pork, poultry, etc.) or entire meals. Marketing and product managers may navigate through the products and items in an options section and then decide exactly how products are presented to the shopper on the menu so the shopping experience is fully customized. An overall theme for the application can be developed to give a consistent look-and-feel in line with the retailers in-store branding and promotion. Multiple "catalogs" of products can be managed simultaneously such that terminals in different stores or locations within a store can target particular market segments. Prime-location kiosks can provide multiple product catalogs that are integrated seamlessly.

Referring to FIG. 3A, a task screen according to an example embodiment of the present invention is shown. The screen flow editor supports tasks related to editing a screen flow, editing a front page (initial screen for store terminals), configuring a store, and importing data. Referring to FIG. 3B, a screen flow selection screen according to an example embodiment of the present invention is shown. Each screen flow 150 may be assigned a beginning and end date that determines when the associated products will be available for shoppers to order. This approach allows a store to develop seasonal or limited time options.

Referring to FIG. 3C, a select main screen for a screen flow according to an example embodiment of the present invention is shown. A screen flow theme may comprise a plurality of options 160 related to the theme. For example, a Thanksgiving theme may comprise main screen options for ordering prepared foods, uncooked meats, and party foods. Each option may be expanded to view additional items associated with the option. Screen areas also include a screen preview area 162 and a screen properties area 164 that display information about a specified main screen.

Referring to FIG. 3D, a define main screen for a screen flow according to an example embodiment of the present invention is shown. The theme and screen flow hierarchy is displayed in an area on the left side of the screen 170. The screen flow is reflected in the screen area and the user may expand or collapse the screens and subscreens by selecting the "+" or "−" options. The action options 172 associated with the screen area 170 are "add a subscreen," "add product" (to a screen by selecting it from the ordering guide product database), and "delete screen." Adding a product results in the addition of a button on a screen for selecting the added ordering guide product.

Each screen may comprise a background photograph or file. This option allows the store to customize the appearance of each screen. When the user selects the add screen option 172, a window for specifying a background file appears 178 over a screen preview area 174 and screen properties area 176. The user then specifies a file containing the desired background.

Referring to FIG. 3E, a properties screen according to an example embodiment of the present invention is shown. The screen preview area 174 displays the specified background photograph or file. In the screen properties area 176, properties for the screen such as the screen name, title, subtitle, footer, button caption, and media file are shown.

Referring to FIG. 3F, a completed order screen for an example embodiment of the present invention is shown. In an example embodiment of the present invention, screen templates are used to define a number of options or buttons and layouts for the screens that can be created. Each option or button takes a shopper to another screen or to a product that can be selected. The "add subscreen" and "add product" options indicate to the screen editor which type of option the user is defining. Each subscreen is defined by properties as shown in the screen properties area 176. The example screen 174 comprises a plurality of product options (i.e., types of turkeys).

Referring to FIG. 3G, an add subscreen screen according to an example embodiment of the present invention is shown. The user specifies a name for the screen 180 and then defines the properties for the new screen in the screen properties area 176. Referring to FIG. 3H, a subscreen according to an example embodiment of the present invention is shown. A subscreen, for example, may comprise details about a specific product. A shopper that sees a product of interest may then select the product subscreen to view details prior to making a purchasing decision. The ordering guide product associated with the subscreen is shown in the screen hierarchy area 190, the subscreen appears in the screen preview area 192, and the properties are defined in the screen properties area 194. Referring to FIG. 3I, selection of a "group items" options allows a user to associate additional items with a particular ordering guide product. When the option is selected, an options group collection identifier is created to facilitate associating options with an ordering guide product. For example, potatoes and gravy options may be associated with one or more turkey options so that a shopper is prompted to select additional products when a primary product is selected.

Referring to FIG. 3J, an add product screen for an example embodiment of the present invention is shown. When the "add product" option 200 is selected, a window comprising items from the ordering guide product database appears 202 allowing the user to add the items to the screen flow. When a product is added, a button for the product appears on the screen.

Referring to FIGS. 3K and 3L, front page edit screens according to an example embodiment of the present invention are shown. As shown in FIG. 3K, the user may select a front page 210 and as shown in FIG. 3L, organize screen flows 220, view them in a screen preview area 224, and select from other screen flows 222 to add to the front page area 220.

Referring to FIG. 3M, a configure store screen for an example embodiment of the present invention is shown. The configure store screen allows a user to view a list of stores 230 and select a front page 232 for display at the shopper terminals located throughout the store. As FIG. 3M indicates, each store may display a different front page and have different screen flows.

Referring to FIG. 3N, a synchronize database screen according to an example embodiment of the present invention is shown. Options for previewing the items to be synchronized and performing the synchronization are shown.

The resulting ordering application created using the screen flow editor contains rich media digital content that is remotely deployed to the retailer's in-store terminals. Different menus for ordering products may be offered to shoppers when they enter the store or at the point of purchase. The screen flow editor assists the user in completing the menu and product screen templates that are populated with data entered by the store manager as well as product data from the retailer's back-office databases or even online store or web site databases.

Completed menu/product selection screens are then downloaded to terminals from a server that hosts a number of XML Web services which provide the menu and product selection information ("screen flow") and inventory to the self-service terminals on request, create suspended transactions in the fulfillment system (to reserve product while the shopper is continuing to fill a "basket"), collect and verify shopper information, schedule the order for delivery or pickup, and ultimately fulfill the order. A Web services component facilitates communications between the ordering computer system and the back-office computer system by providing such services as database structure translation.

Referring to FIG. 4, a system architecture diagram for a self-service ordering guide system according to an example embodiment of the present invention is shown. A screen flow menu designer uses a computer 150 to access an ordering guide system server 154 via the Internet 152. The ordering guide system server 154 comprises an ordering guide system application 156 which has the screen flow editor 158 used to construct menu pages in the form of hierarchical "screen flows" that ultimately appear on the self-service terminals for use by shoppers. The ordering guide system application also has a XML Web service 158 for transferring menus to self-service terminals 168. Because the ordering guide system application 156 is a Web application, it can be accessed from the menu designer's local computer 150 via an Internet browser connected to the ordering guide system server 154.

The screen flow editor 158 uses a data adapter for accessing the retailer's product information database 162 and product inventory database 164. The screen flow editor data adaptor imports and synchronizes the data from retailer product information database 162 and product inventory database 164 into the ordering guide system application's 156 own database. Products in the ordering guide product database 156 and the product information and inventory databases 162,164 are linked according to an external product identifier. The data adaptor synchronizes the ordering guide product database with the back-office databases periodically so that the ordering guide system application provides current product information to shoppers and does not permit them to order out-of-stock items. The data adaptor may be customized to operate with back-office computer systems and databases from a variety of vendors.

The self-service terminals 168 comprise an ordering guide system client 170. An ordering guide system application 172 displays the menus to the shopper 166 and guides the shopper 166 through placing an order. Screen flow and product information is queried from the ordering guide system server application XML Web service 160 at pre-determined intervals and cached on the ordering guide system client 170. The data adaptor at the ordering guide system server sends product order information to the back-office databases so that the product inventory is updated appropriately. The framework then provides a transactional pipeline with independent components for specific functionality such as product selection, printing, and fulfillment.

Communication with the terminal screen flow presentation is accomplished using XML screen definitions that are passed through to an Adobe® Flash user interface that data-binds XML to user interface elements. This approach allows for an attractive, engaging user interface that can be used to represent a large number of products. Costs are reduced because it is not necessary to re-author the Flash user interface when products are added or modified.

A remote management runtime component 174 of the ordering guide system client 170 provides the ability to monitor and report real-time status of devices to a centralized enterprise server 176. Statistics of usage are gathered and notifications are automatically sent out regarding the status of terminals requiring attention (e.g., replacement of paper).

The ordering guide system of the present invention reduces a store's reliance on manual processes and provides a solution to stores for in-store ordering that is easy to implement and to update for many events throughout the year. A store representative can tailor screen flows to meet the needs of the store and even at different locations within each store. The resulting screen flows are easy for shoppers to understand and use and that allows them to place orders with little or no assistance from store representatives. The ability to order products while in the store allows some stores to stock few items. For example, a store that sells accessories for custom suits may choose to stock items in a range of sizes but not all colors for all sizes. The shopper may order additional items such as shirts and belts in an appropriate size and colors while in the store and have them shipped or arrange to pick them up when returning for the suit. Tying in-store ordering to a store's back-office database offers advantages over centralized processing. Many large retailers maintain inventories at regional warehouses. Processing orders and allocating products based on local or regional demand increases efficiencies for the retailer and allows the retailer to respond appropriately to shopper needs within specific regions. Orders may be fulfilled from inventories in proximity to where the orders are placed so that shoppers receive their orders sooner. The order options and available inventories reflect local and regional shopper preferences so that retailers are better able to serve their customers.

While example embodiments of the invention have been illustrated and described, various modifications and combinations can be made without departing from the spirit and scope of the invention. Modifications, combinations, and equivalents to the system and method of the present invention are intended to be covered and claimed.

The invention claimed is:

1. A computerized system for shopper self-service ordering in a retailer's store comprising:
   (a) a retailer product information database comprising information for products available from said retailer's store inventory or a warehouse serving said retailer's store;
   (b) an ordering guide product database comprising products from said retailer product information database identified as currently in-stock said retailer's store inventory or a warehouse serving said retailer's store;
   (c) an ordering guide system server comprising:
      (1) a synchronization application for removing from said ordering guide product database selected products that are identified as out-of-stock in said retailer product information database; and
      (2) a services application for communicating with a plurality of self-service terminals in said retailer's store;
   (d) a computer for use by a menu designer:
      (1) to create a plurality of menus comprising options for selecting products defined in said ordering guide product database;
      (2) to associate with each of said plurality of menus dates that determine when shoppers can order associated products; and
      (3) to deploy through said ordering guide system server to:
         (i) a first self-service terminal a first plurality of menus for purchasing a first group of products from said ordering guide product database; and
         (ii) a second self-service terminal a second plurality of menus for purchasing a second group of products from said ordering guide product database;
   (e) wherein said first and second a-self-service terminals comprise an ordering guide system application that:
      (1) displays said plurality of menus to a shopper consistent with associated dates;
      (2) responds to said shopper's selection of options on said menus;
      (3) creates a product order for said shopper's selection of at least one product from said menus;
      (4) receives said shopper's selection of a date for receiving said product order;
      (5) communicates said product order to said ordering guide system server; and
   (f) a retailer fulfillment system for:
      (1) receiving said product order from said ordering guide system; and
      (2) processing said product order for delivery of said at least one
   product to said shopper on said date for receiving said product order selected by said shopper.

2. The system of claim 1 wherein said retailer fulfillment system processes said product order for delivery of said at least one product to said shopper by arranging for delivery of said at least one product to said retailer's store.

3. The system of claim 1 wherein said retailer fulfillment system processes said product order for delivery of said at least one product to said shopper by arranging for delivery of said at least one product to said shopper's home.

4. The system of claim 1 wherein said synchronization application synchronizes products according to a product identifier.

5. The system of claim 1 wherein said ordering guide product database comprises for each of a plurality of products a name, a description, a price, and an options group collection identifier for linking said product to other products.

6. The system of claim 1 wherein said plurality of menus comprises options for selecting food products at a grocery store.

7. The system of claim 1 wherein said ordering guide system application at said self-service terminal accepts payment from said shopper for said product order.

\* \* \* \* \*

UNITED STATES PATENT AND TRADEMARK OFFICE
CERTIFICATE OF CORRECTION

PATENT NO. : 7,711,600 B1
APPLICATION NO. : 11/842322
DATED : May 4, 2010
INVENTOR(S) : John Curran and Michael A. Curran It is certified that error appears in the above-identified patent and that said Letters Patent is hereby corrected as shown below:

In Column 4, line 41, please delete "a" and insert -- is a --

In Column 4, line 45, please delete "are a" and insert -- are --

In Column 10, line 24, please delete "a-self" and insert -- a self --

Signed and Sealed this

Fifteenth Day of June, 2010

David J. Kappos
*Director of the United States Patent and Trademark Office*